O. BOYER.
COMBINED HAY RAKE AND LOADER.
APPLICATION FILED APR. 19, 1909.
938,959.
Patented Nov. 2, 1909.
3 SHEETS—SHEET 1.
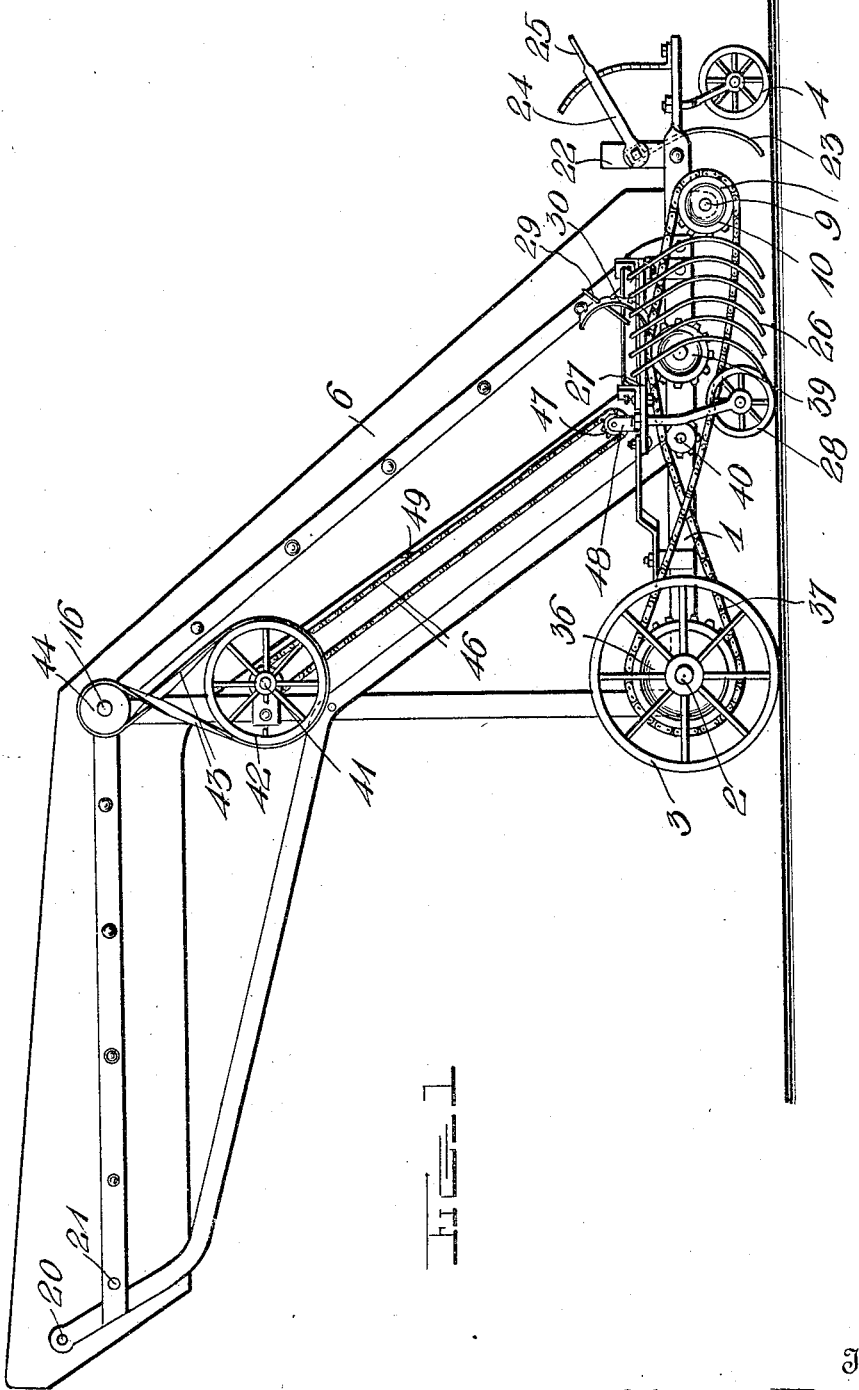
Witnesses
Inventor
Oliver Boyer
by H. B. Willson & Co
Attorneys O. BOYER.
COMBINED HAY RAKE AND LOADER.
APPLICATION FILED APR. 19, 1909.
938,959.
Patented Nov. 2, 1909.
3 SHEETS—SHEET 2.
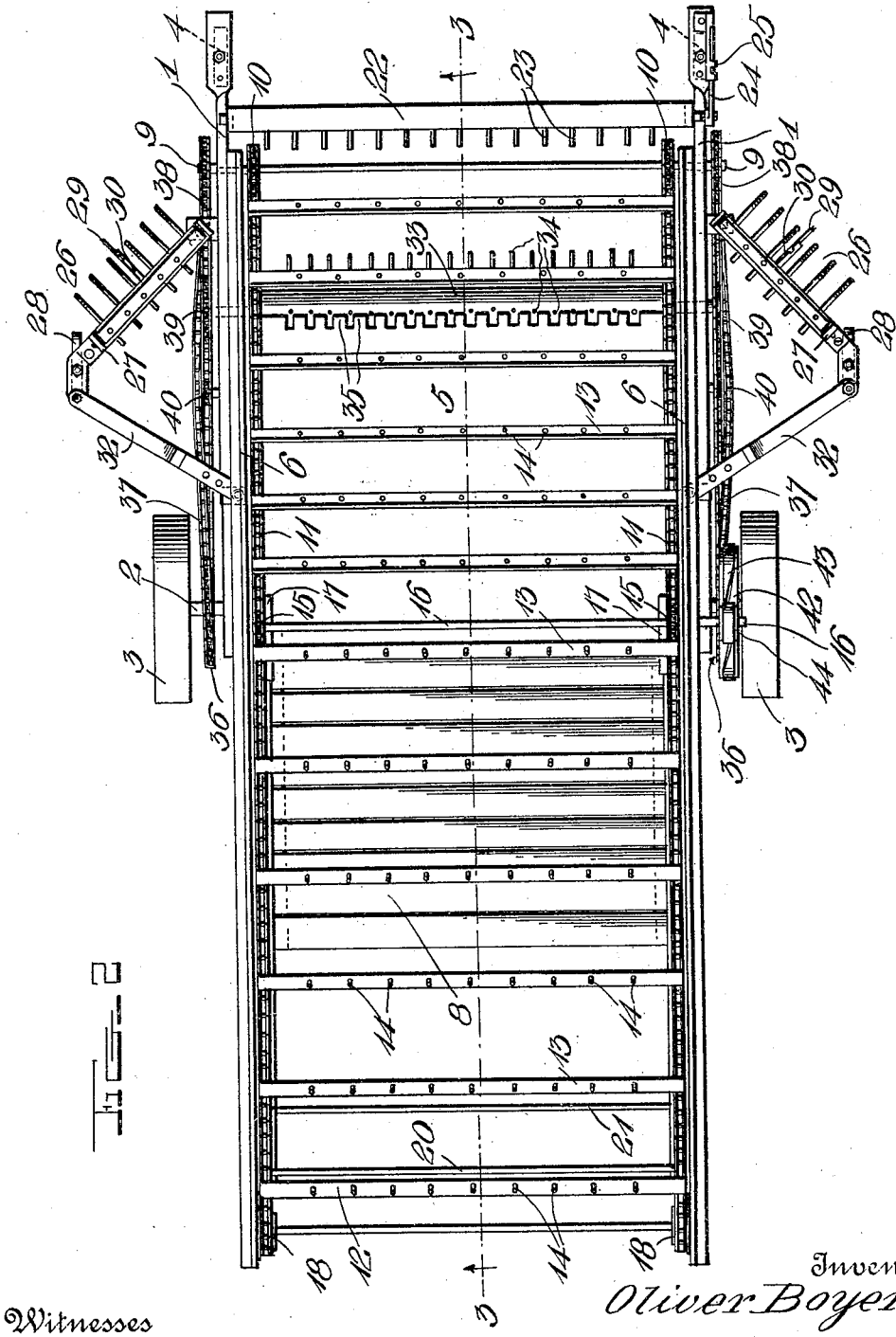
Witnesses
C. H. Griesbauer
Inventor
Oliver Boyer
by H. B. Willson &co
Attorneys O. BOYER.
COMBINED HAY RAKE AND LOADER.
APPLICATION FILED APR. 19, 1909.
938,959.
Patented Nov. 2, 1909.
3 SHEETS—SHEET 3.
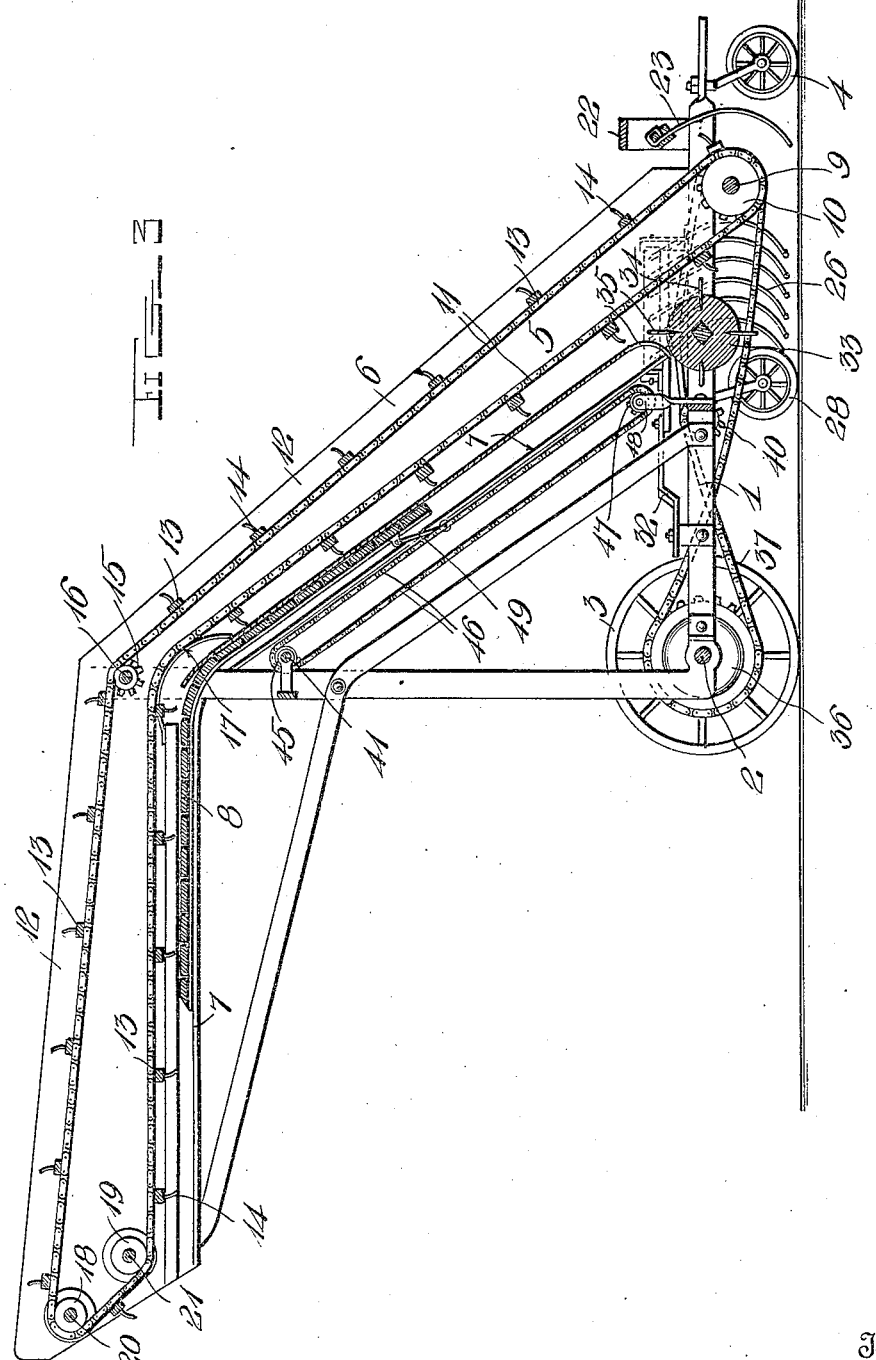
Witnesses
C. ...
C. H. Griesbauer.
Inventor
Oliver Boyer
by H. B. Willson & Co
Attorneys

UNITED STATES PATENT OFFICE.

OLIVER BOYER, OF SPENCERVILLE, OHIO.

COMBINED HAY RAKE AND LOADER.

938,959.  Specification of Letters Patent.  Patented Nov. 2, 1909.

Application filed April 19, 1909. Serial No. 490,809.

*To all whom it may concern:*

Be it known that I, OLIVER BOYER, a citizen of the United States, residing at Spencerville, in the county of Allen and State of Ohio, have invented certain new and useful Improvements in a Combined Hay Rake and Loader; and I do declare the following to be a full, clear, and exact description of the invention, such as will enable others skilled in the art to which it appertains to make and use the same.

This invention relates to improvements in combined hay rakes and loaders.

The object of the invention is to provide a self raking hay loader by means of which the hay is gathered and loaded into a wagon to which the machine is attached.

A further object is to provide a device of this character having means whereby the hay when elevated by the loader will be spread out or distributed over the hay rack on the wagon.

With the foregoing and other objects in view, the invention consists of certain novel features of construction, combination and arrangement of parts, as will be more fully described and particularly pointed out in the appended claims.

In the accompanying drawings, Figure 1 is a side view of a combined hay rake and loader constructed in accordance with the invention, showing the same in position at the rear end of the wagon body, a portion of the latter being shown in dotted lines; Fig. 2 is a top plan view of the same; Fig. 3 is a vertical longitudinal sectional view on the line 3—3 of Fig. 1, looking in the direction of the arrow.

Referring more particularly to the drawings, 1 denotes the supporting frame of the machine in the forward end of the lower portion of which is mounted an axle 2, on the ends of which is fixedly secured front supporting wheels 3. The rear end of the frame 1 is provided with swiveled supporting wheels or casters 4.

In the rear portion of the frame 1 is arranged an inclined elevator chute or trough 5, the sides 6 of which are continued forwardly at the upper end of the chute and said sides have on their lower edges inwardly projecting guides 7 between which is slidably mounted a slatted distributing apron 8. The slatted apron 8 is adapted to be reciprocated in a manner hereinafter described.

In the lower portion of the rear end of the machine is revolubly mounted a conveyer operating shaft 9 on which, adjacent to its opposite end, are fixedly mounted sprocket wheels 10 with which are engaged chains 11 of the endless conveyer or elevator 12, which consists of a series of cross bars or slats 13 each of which is provided on one side with a series of teeth 14 which are adapted to gather the hay from ground and draw the same up the inclined chute or trough and onto the slatted apron 8 by means of which it is evenly distributed on the hay rack on the wagon. The upper stretch of chains 11 of the conveyer passes over sprocket wheels 15 on a shaft 16 revolubly mounted in the upper ends of the sides 6 of the chute and the lower stretch of the chains passes over curved guide flanges 17 arranged on the inner walls of the sides below the sprocket wheels 15. The chains 11, after passing over the sprocket wheels 15 and flange 17 continue to the end of the forwardly extended sides of the chute and pass around guide pulleys 18 and 19 mounted on transversely disposed shafts 20 and 21 which are mounted in suitable bearings in the forward end of the frame and sides of the chute.

On the rear end of the lower portion of the frame 1 is arranged a rake supporting frame 22 in which is adjustably mounted a spring toothed rake 23 which is adapted to trail behind the lower end of the conveying and elevating mechanism to gather any hay which is not taken up by the elevating mechanism. The rake 23 is provided on one end with an adjusting lever 24 by means of which the rake may be raised or lowered to inoperative or operative positions. The lever is adapted to be engaged with a notched rack bar 25 by means of which the rake is held in its adjusted positions.

In addition to the rake 23, the machine is provided with additional side rakes 26 which are adjustably mounted in a frame 27 one end of which is pivotally connected to the side bars of the main frame, adjacent to the lower end of the chute 5, while the outer ends of said rake frames are loosely connected to and supported by caster wheels 28. The side rakes are provided with adjusting levers 29 which are adapted to be engaged with segmental racks 30 on the frames 27 whereby the rakes may be held in their adjusted positions. The side rakes 26 are provided to rake up and throw the hay along the sides of the machine beneath the same and into the path of movement of the conveyer by which it is gathered up and carried to the wagon. The side rakes are held at the desired angle at the sides of the machine by means of connecting bars 32, the outer ends of which are pivotally secured to the outer ends of the frame 27 while their inner ends are provided with a series of apertures by means of which the bars are adjustably bolted or otherwise secured to the frames of the machine.

In the lower rear portion of the frame 1 at the lower end of the conveyer chute 5 is revolubly mounted the clearing roller 33 provided with a series of radially projecting teeth or pins 34 which work between the teeth on the slats of the conveyer and between curved teeth 35 formed on the lower end of the bottom of the chute, as shown. The clearing roller is provided to prevent the hay from bunching and dragging at the rear end of the machine.

On the outer ends of the axle 2, between the wheels 3 and the sides of the frame, are mounted sprocket gears 36 which are connected by cross chains 37 to sprocket gears 38 on the ends of the shaft 9 thereby providing for the operation of the conveyer by the axle 2 and the wheels 3. The chains 37 also pass over sprocket gears 39 on the ends of the clearing roller shaft, thereby operating said roller. The upper stretch of the chains also engage idle supporting gears 40 which are mounted on the stub-shafts on the adjacent sides of the lower portion of the frame 1.

In the upper portion of the frame is revolubly mounted an apron driving shaft 41 on the outer end of which is fixedly mounted a pulley 42 which is connected by a cross belt 43 to a small pulley 44 on the outer end of the upper conveyer shaft 16, whereby the motion is imparted to the apron operating shaft. On the inner end of the apron operating shaft 41 is fixedly mounted a sprocket gear pinion 45 around which passes a sprocket chain 46 which also engages a sprocket pinion 47 which is suitably mounted in a bracket 48 on the lower portion of the frame 1 adjacent to the lower end of the underside of the chute 5. The rear end of the slatted apron 8 is loosely connected to one side of the chain 46 by means of a pitman rod 49 whereby when the chain is operated through the pinion 45 and pulleys 42 and 44, the slatted apron will be reciprocated or moved back and forth lengthwise between the forwardly extended sides of the conveyer chute, thus distributing the hay onto the rack of the wagon, over which said forward end of the conveyer chute projects.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. A self raking hay loader comprising a wheeled supporting frame, a forwardly and upwardly inclined chute arranged in said frame, said chute having a forwardly extended portion at its upper end to provide a guiding and supporting frame, a slatted apron slidably mounted in said frame, an endless conveyer arranged in said chute to pick up and elevate the hay onto said distributing apron, means operated by the conveyer for reciprocating said apron means to prevent the bunching of the hay at the lower end of the elevating mechanism, and a rake arranged at the rear end of the machine.

2. A self raking hay loader comprising a wheeled supporting frame, a forwardly and upwardly inclined chute arranged in said frame and having at its upper end a forwardly projecting extension, a slatted apron slidably mounted beneath said chute and in said extension, an endless conveyer operatively mounted in said chute to elevate and discharge the hay onto said apron, means whereby the apron is operated by the movement of the conveyer, a clearing roll operatively mounted at the lower end of the chute to prevent the bunching of the hay gathered by the conveyer, and means whereby said conveyer and clearing roll are operated.

3. In a self raking hay loader, a wheeled supporting frame, a forwardly and upwardly inclined conveyer chute arranged in said frame, a distributing mechanism at the upper end of said chute, an endless conveyer operatively mounted therein to pick up and convey the hay to said distributing mechanism, means operated by the conveyer for reciprocating said distributing mechanism, said conveyer mechanism comprising sprocket chains and a series of cross slats connecting said chains and adapted to coöperate with said chute, an operating mechanism to connect said elevating mechanism with the supporting wheels of the machine, whereby the conveyer is operated, a rake adjustably mounted on the rear end of said frame, means to raise and lower said rake and to hold the same in its adjusted positions, side rakes pivotally mounted on the opposite sides of the frame adjacent to the lower end of said chute, means to hold said side rakes at different angles on the sides of the machine, and means whereby said rakes are raised and lowered and held in operative or inoperative position.

In testimony whereof I have hereunto set my hand in presence of two subscribing witnesses.

OLIVER BOYER.

Witnesses:
   IRA B. POST,
   C. GESELLCHEN.